US010002339B2

(12) United States Patent
Prieto et al.

(10) Patent No.: US 10,002,339 B2
(45) Date of Patent: Jun. 19, 2018

(54) POST-DISASTER ASSESSMENT SYSTEMS AND METHODS

(71) Applicant: FLUOR TECHNOLOGY CORPORATION, Aliso Viejo, CA (US)

(72) Inventors: Robert Prieto, Princeton Junction, NJ (US); David Vaughn, Central, SC (US); Jeffrey M Plumblee, II, Lyman, SC (US); Marnie Ball, Arlington, VA (US)

(73) Assignee: Fluor Technologies Corporation, Sugar Land, TX (US)

( * ) Notice: Subject to any disclaimer, the term of this patent is extended or adjusted under 35 U.S.C. 154(b) by 371 days.

(21) Appl. No.: 14/329,575

(22) Filed: Jul. 11, 2014

(65) Prior Publication Data

US 2015/0019267 A1 Jan. 15, 2015

Related U.S. Application Data

(60) Provisional application No. 61/845,224, filed on Jul. 11, 2013.

(51) Int. Cl.
*G06Q 40/00* (2012.01)
*G06Q 10/06* (2012.01)

(52) U.S. Cl.
CPC .................. *G06Q 10/067* (2013.01)

(58) Field of Classification Search
CPC ...................................... G06F 17/00
USPC .......... 705/4, 1.1, 7, 317, 305, 35, 38, 7.28, 705/7.29; 714/4.3, 3, 4.1, 33, 6.12; 345/419, 212
See application file for complete search history.

(56) References Cited

U.S. PATENT DOCUMENTS

| 7,058,847 | B1 | 6/2006 | Guzman et al. |
| 7,266,558 | B2* | 9/2007 | Gray ...................... G06Q 99/00 455/456.1 |
| 7,757,111 | B2 | 7/2010 | Brettell et al. |
| 7,898,458 | B2 | 3/2011 | Shibayama et al. |

(Continued)

FOREIGN PATENT DOCUMENTS

| JP | 2007109107 | 4/2007 |
| JP | 2009295062 | 12/2009 |
| JP | 2012083172 | 4/2012 |

*Primary Examiner* — John H Holly
(74) *Attorney, Agent, or Firm* — Conley Rose, P.C.

(57) ABSTRACT

A disaster assessment system is presented. The disaster assessment system generates one or more impact reports detailing the nature of how a disaster has impacted a building site based on sensor data associated with the building site that is collected after the disaster. According to one aspect of the inventive subject matter, the disaster assessment system includes a sensor platform, a pre-disaster database, a historic disaster database, and an impact assessment engine. The sensor platform obtains sensor data reflecting a building site before, during, and/or after an event. The impact assessment engine derives a pre-event 3D model based on sensor data collected by the sensor platform before the event, and derives a post-event 3D model based on sensor data collected by the sensor platform after the event. The impact assessment engine then generates the impact reports based on a difference between the pre-event 3D model and the post-event 3D model.

27 Claims, 5 Drawing Sheets

(56) References Cited

U.S. PATENT DOCUMENTS

| | | | |
|---|---|---|---|
| 8,872,818 B2* | 10/2014 | Freeman | G01S 17/023 |
| | | | 345/419 |
| 2004/0153698 A1 | 8/2004 | Guzman et al. | |
| 2005/0273330 A1 | 12/2005 | Johnson | |
| 2009/0265193 A1* | 10/2009 | Collins | G06Q 30/0185 |
| | | | 705/4 |
| 2011/0130636 A1 | 6/2011 | Daniel | |
| 2012/0139893 A1 | 6/2012 | Chung et al. | |
| 2012/0286952 A1 | 11/2012 | Cienfuegos | |
| 2012/0319893 A1* | 12/2012 | Yun | G01S 13/9023 |
| | | | 342/25 C |

* cited by examiner

US 10,002,339 B2

POST-DISASTER ASSESSMENT SYSTEMS AND METHODS

This application claims priority to U.S. Application 61/845,224, filed Jul. 11, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is disaster assessment technologies.

BACKGROUND

The following description includes information that may be useful in understanding the present invention. It is not an admission that any of the information provided herein is prior art or relevant to the presently claimed invention, or that any publication specifically or implicitly referenced is prior art.

Post disaster assessment of infrastructure systems and buildings currently relies on gross assessments utilizing aerial and satellite surveys and subsequent on the ground inspections conducted visually through human interaction. These assessments are time consuming and may involve large teams of people for extended periods in logistically challenged areas. Pre-event conditions are not typically captured other than at a gross aerial level because of the costs involved.

Quite a bit of effort has been directed to enabling business entities to recover from disastrous loss of data or maintain business continuity. Example works directed toward maintaining business continuity include U.S. Pat. No. 7,058,847 to Guzman et al. titled "Concept of Zero Network Element Minoring and Disaster Restoration Process" filed Dec. 30, 2002; and U.S. Pat. No. 7,757,111 to Brettell et al. titled "Method and System for Insuring Data Integrity in Anticipation of a Disaster" filed Apr. 5, 2007. Further, additional effort has been directed toward establishing or maintaining communication networks as discussed in U.S. patent application publication 2005/0273330 to Johnson titled "Anti-Terrorism Communications Systems and Devices" filed May 25, 2005. Unfortunately these efforts fail to provide insight into physical damage or disaster assessments at a building site after a disaster.

Beyond data or business continuity, effort has also been put forth toward some forms of assessment after a damaging event. For example, U.S. Pat. No. 7,266,558 to Gray titled "Method and Apparatus for Global Relief Management" filed Feb. 2, 2004, describes providing damage assessment reports among authorized parties. Further, U.S. Pat. No. 7,898,458 to Shibayama et al. titled "Disaster Countermeasure Support Method", filed Aug. 3, 2007 as an international application describes comparing radar images to grasp a damaged situation. In a similar vein, U.S. patent application publication 2009/0265193 to Collins et al. titled "Methods and Systems for Automated Property Insurance Inspection", filed Apr. 17, 2009, discussing using video images to inspect damage in support for insurance claims. Still another example includes U.S. patent application 2011/0130636 to Daniel et al. titled "Systems, Methods, and Devices for the Rapid Assessment and Deployment of Appropriate Modular Aid Solutions in Response to Disasters", filed Aug. 27, 2010, which discuss using remotely operated vehicles (unmanned aerial sea or land systems) in support for conducting assessments. Still further, U.S. patent application 2012/0319893 to Yun et al. titled "Damage Proxy Map from Interferometric Synthetic Aperture Radar Coherence" filed Jun. 20, 2012 discusses using map information from prior and subsequent to a damage event to create a proxy damage map. These references, although useful in their own right, fail to provide a more complete understanding of the multi-faceted impact that a disaster can have one a building site as well as the impact according to different levels of the site (e.g., below ground, ground level, above ground, etc.).

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a disaster assessment system capable of providing multi-faceted and multi-level impact estimates.

SUMMARY OF THE INVENTION

The inventive subject matter provides apparatus, systems and methods in which a disaster assessment system can generate one or more impact reports detailing the nature of how a disaster has impacted a building site based on sensor data associated with the building site that is collected after the disaster. According to one aspect of the inventive subject matter, the disaster assessment system includes a sensor platform, a pre-disaster database, a historic disaster database, and an impact assessment engine.

The sensor platform can be programmed to obtain sensor data reflecting a building site before, during, and/or after an event. For example, a fleet of unmanned vehicles (e.g., unmanned aerial vehicles, unmanned ground vehicles, etc.) can be equipped with sensors (e.g., image sensors, LIDAR, radar, thermal sensors, etc.) and instructed to collect sensor data of a building site before an event occurs in order to capture pre-event assessment data. The pre-event assessment data can then be stored within the pre-disaster database. Further, the sensor platform can be used to obtain post-event assessment data after the event.

In some embodiments, the impact assessment engine derive a pre-event three-dimensional (3D) model of the building site based on the pre-event assessment data, and derive a post-event 3D model of the building site based on the post-event assessment data. The 3D models indicate sizes (e.g., lengths, width, heights, etc.), relative locations, relative elevations, and thermal information of different components of the building site.

The impact assessment engine then leverages both the pre and post-event 3D model of the building site to generate one or more damage profiles for the building site. The damage profiles could include information related to damages to the building site across different dimensions. For example, the damage profiles can include damage information related to a specific type of damage possibly including flood damage, loss of life, structural damage, or other types of damages. Further the damage profiles can reflect damages at different levels of the building site. The damage profile can include a below-surface profile (e.g., faults, geology, basements, etc.), surface profile (e.g., flooding, mud slides, debris, etc.), above-surface profile (e.g., debris cloud, dust, containments, etc.), or even internal structural profiles. The impact assessment engine can further leverage the damage profile to produce an impact report for the building site where the impact report can provide one or more estimates relating to the damage. Example estimates can include indictors of risk, damage, costs, logistical constraints, communication outages, flooding, insurance claims, or other types of estimates.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
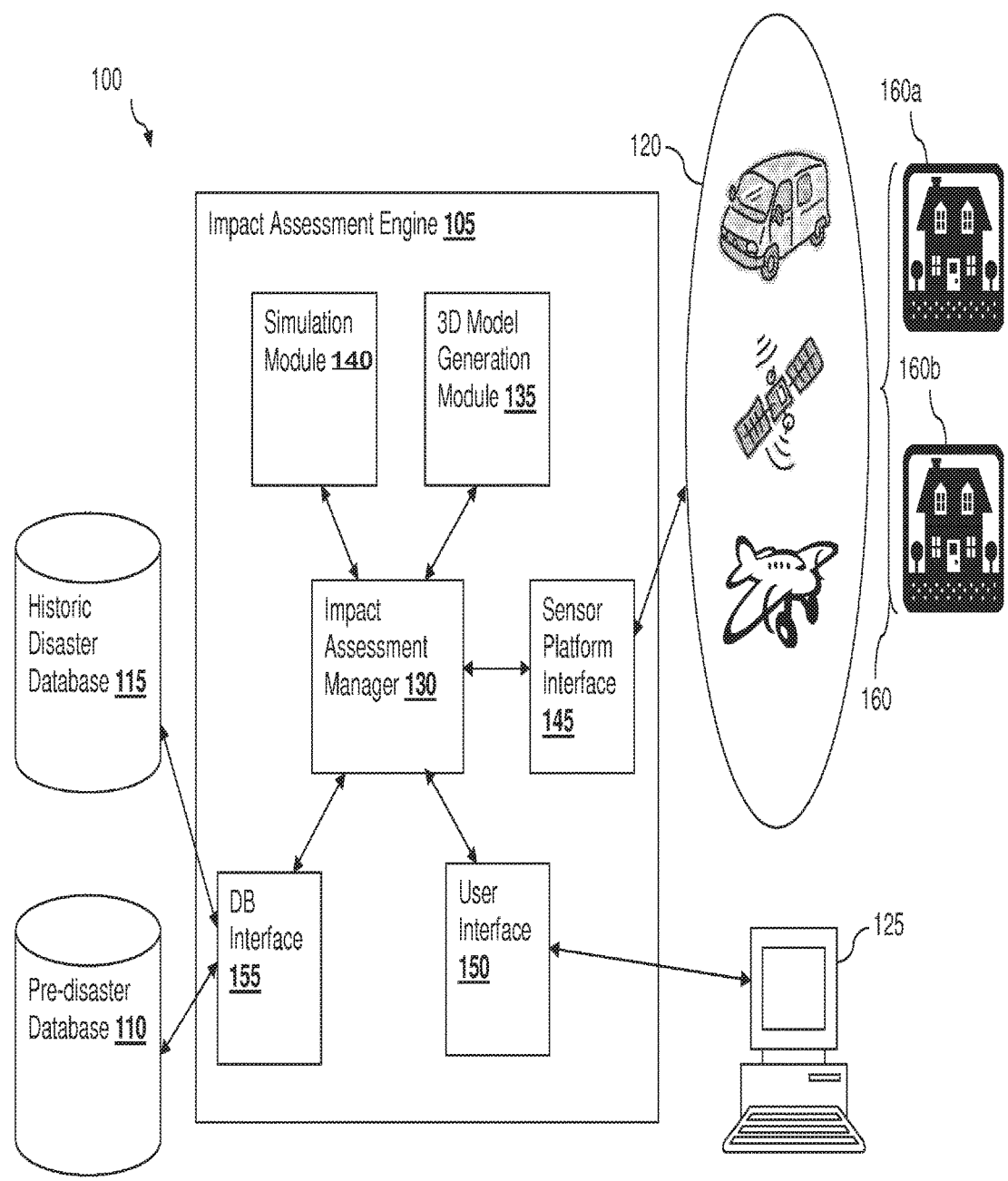
FIG. 1 is a schematic of an impact assessment system capable of assessing an impact of a disaster on a building site.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods in which a disaster assessment system can generate one or more impact reports detailing the nature of how a disaster has impacted a building site based on sensor data collected after the disaster. According to one aspect of the inventive subject matter, the disaster assessment system includes a sensor platform, a pre-disaster database, a historic disaster database, and an impact assessment engine.

The sensor platform can be instructed by the impact assessment engine to obtain sensor data reflecting a building site before, during, and/or after an event (e.g., a disaster). For example, a fleet of unmanned vehicles (e.g., unmanned aerial vehicles, unmanned ground vehicles, etc.) can be equipped with sensors (e.g., image sensors, LIDAR, radar, thermal sensors, etc.) and be instructed to collect sensor data of a building site before an event occurs in order to capture pre-event assessment data. The pre-event assessment data can then be stored within the pre-disaster database. Further, the sensor platform can be used to obtain post-event assessment data after the event.

In some embodiments, the impact assessment engine derive a pre-event three-dimensional (3D) model of the building site based on the pre-event assessment data, and derive a post-event 3D model of the building site based on the post-event assessment data. The 3D models indicate sizes (e.g., lengths, width, heights, etc.), locations (absolute locations and relative locations with respect to each other), elevations, and thermal information of different components (elements) of the building site.

The impact assessment engine then leverages either the post-event 3D model alone, or in combination with the pre-event 3D model of the building site to generate one or more damage profiles for the building site. The damage profiles could include information related to damages to the building site across different dimensions. For example, the damage profiles can include damage information related to a specific type of damage possibly including flood damage, loss of life, structural damage, or other types of damages. Further the damage profiles can reflect damages at different levels of the building site. The damage profile can include a below-surface profile (e.g., faults, geology, basements, etc.), surface profile (e.g., flooding, mud slides, debris, etc.), above-surface profile (e.g., debris cloud, dust, containments, etc.), or even internal structural profiles. The impact assessment engine can further leverage the damage profile to produce an impact report for the building site where the impact report can provide one or more estimates relating to the damage. Example estimates can include indictors of risk, damage, costs, logistical constraints, communication outages, flooding, insurance claims, or other types of estimates.

FIG. 1 illustrates an example disaster assessment system 100 of some embodiments. The disaster assessment system 100 comprises an impact assessment engine 105 that is communicatively coupled with a pre-disaster database 110, a historic disaster database 115, a sensor platform 120, and an output device 125.

The impact assessment engine 105 includes an impact assessment manager 130, a 3D model generation module 135, a simulation module 140, a sensor platform interface 145, a user interface 150, and a database interface 155. Each of these modules can be implemented as software that when executed by one or more processors perform different functions for the impact assessment engine 105. For example, the database interface 155 serves as an interface between the impact assessment engine 105 and the two databases: the pre-disaster database 110 and the historic disaster database 115. As such, the impact assessment engine retrieves data from the pre-disaster database 110 and the historic disaster database 115 via the database interface 155. Similarly, the sensor platform interface 145 serves as an interface between the impact assessment engine 105 and the sensor platform 120, and the user interface 150 serves as an interface between the impact assessment engine 105 and the output device 125.

As mentioned above, the impact assessment engine 105 of some embodiments is programmed to instruct the sensor platform 120 to obtain sensor data of a building site 160 before, during, and/or after an event (e.g., a disaster). The building site 160 can include one or more building structures, and in this example, the building site 160 includes two buildings 160a and 160b. The sensor platform 120 can include different types of sensors that are programmed to obtain different types of sensor data related to the building site 160. For example, the sensor platform 120 can include a location sensor (e.g., a global position system (GPS) sensor) for obtaining location data and an image sensor for obtaining still images and/or videos (i.e., multiple image frames) of the building site 160. In some embodiments, the sensor platform 120 can also include a laser imaging sensor (e.g., LIDAR) obtaining distance data between the sensor and a target point of the building site 160. In some of these embodiments, the sensor platform 120 can also include a wall/ground penetrating radar for obtaining distance data between the sensor and a target point that is internal to the building 160. By measuring the distances between the sensor and different target points of the building site 160, the impact assessment engine 105 can derive the sizes, (e.g., dimensions) shapes, and orientation of the structures (e.g., beams, roof, porch, pipes, etc.) of the building site 160.

In some embodiments, the sensor platform 120 can also include a thermal sensor for obtaining thermal data (e.g., heat distribution information) of the building site 160 and a ground penetrating radar sensor for obtaining information of portions the building site that is not readily visible to human eyes (e.g., condition below the ground surface such as piping information, condition an enclosed building structure, condition inside a building structure, etc.).

Figure 2:
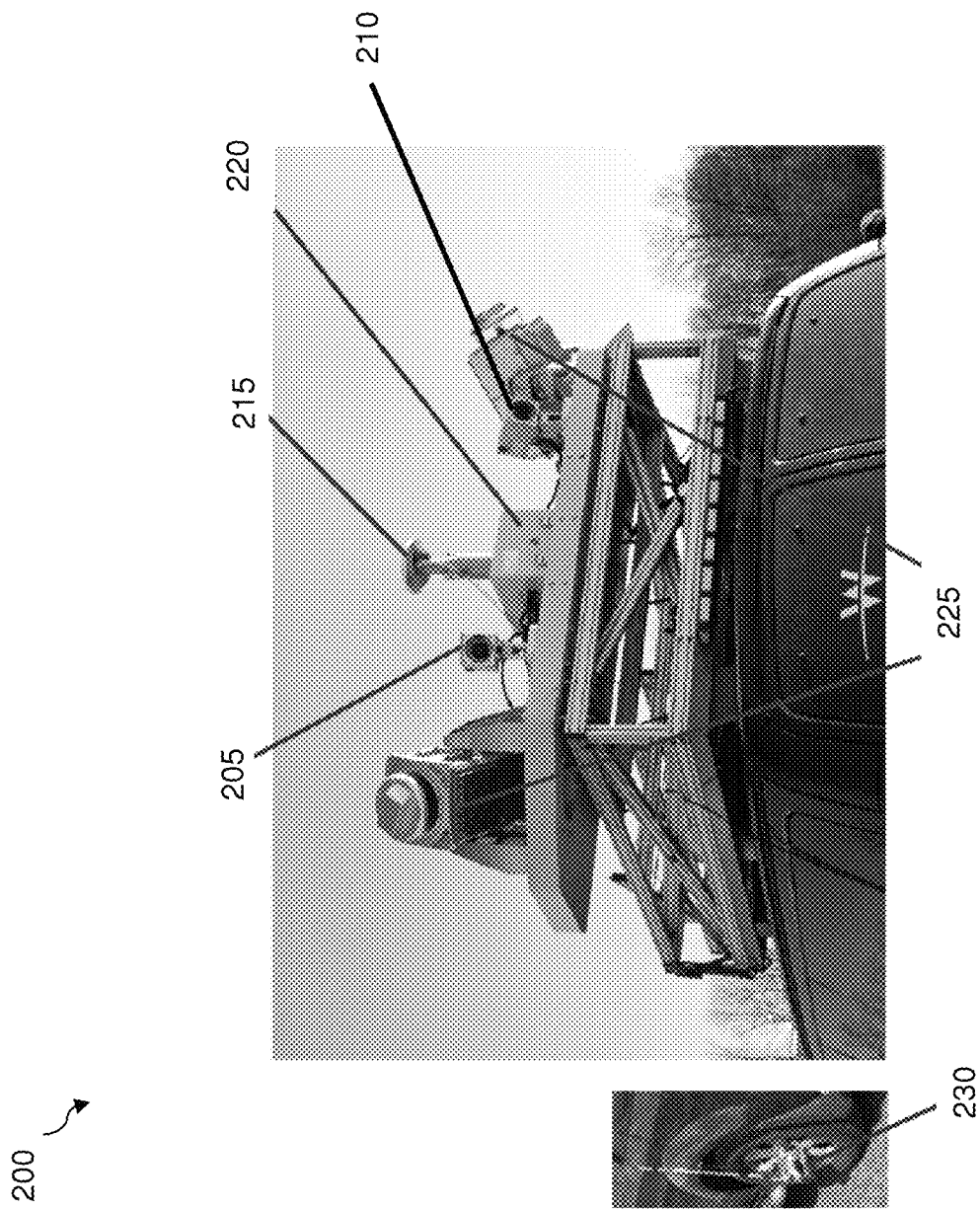
FIG. 2 is an example vehicle equipped with different sensors.

In addition, one or more of these sensors from the sensor platform 120 can be attached to a vehicle (e.g., an unmanned aerial vehicle, an unmanned ground vehicle) and/or a satellite so that they can be deployed to capture sensor data of the building site 160 when instructed to do so. FIG. 2 illustrates an example ground vehicle 200 that is part of the sensor platform 120. As shown, the vehicle 200 is equipped with multiple sensors, including two high definition cameras 205 and 210, a differential GPS receiver 215 that is capable of identifying a location within 10 centimeter of accuracy, a weapon grade inertia measurement unit (IMU) 220 for assisting in navigating the vehicle 200, two laser scanners 225, and a distance measuring instrument (DMI) 230 installed on one of the wheels of the vehicle 200. Although this figure only shows sensors being implemented on a ground vehicle, the sensors (and other additional sensors) can also be implemented on airplanes and/or satellite to supplement sensor data collected via the ground vehicle 200.

Referring back to FIG. 1, the impact assessment manager 130 is programmed to retrieve the sensor data of the building site 160 from the sensor platform 120 via the sensor platform interface 145. For security purposes, the sensor data can be encrypted using conventional encryption algorithms before transmitting from the sensor platform 120 to the impact assessment engine 105. Once the sensor data is received, the impact assessment manager 130 sends the sensor data to the 3D model generation module 135 to derive a 3D model of the building site 160 using the sensor data collected by the sensor platform 120.

The different types of sensor data obtained by the sensor platform 120 collectively enables the 3D model generation module 135 to derive a comprehensive three dimensional (3D) model for the building site 160. For example, the 3D model generation module 135 uses the location data (e.g., from GPS), distance data (e.g., from a laser imaging sensor such as LIDAR) and image data (e.g., from camera) to determine an absolute location of different elements (e.g., a pole, a porch, a barn, a tree, the frame of a building, etc.) of the building site 160, relative locations of elements (e.g., a pole, a porch, a barn, a tree, the frame of a building, etc.) with respect to each other within the building site 160, elevation of different structures (e.g., floor, front door, roof, etc.) with respect to the ground, and sizes, shapes, and orientation of the different structures of the building site 160. As mentioned before, the sensor platform was instructed by the impact assessment engine 105 to capture sensor data related to the building site 160 from different perspective (e.g., different points of view, different angles, etc.). In some embodiments, sufficient sensor data is captured such that the 3D model generation module 135 can sketch a complete three-dimensional model of the building site 160 using the sensor data.

The 3D model includes the location, size, shape of different structures of the building site 160. In some embodiments, the 3D model generation module 135 also uses the thermal data to superimpose a heat distribution map on top of the 3D model to represent the distribution of heat in different areas of the building site 160. The heat distribution information is useful because it can indicate areas where a flood has occurred or areas where there might be surviving bodies. Preferably, the 3D model generation module 135 also uses the ground penetrating sensor data (e.g., from a ground penetrating radar sensor) to determine the location, size, and shape of structures that are not readily visible by naked eyes (e.g., interior of a building structure, piping within walls, underground (below surface) piping, etc.) as part of the derived 3D model of the building site 160.

In some embodiments, the impact assessment engine 105 is programmed to instruct the sensor platform 120 to obtain sensor data of the building site 160 after an event (e.g., a disaster such as an earthquake, a rainstorm, a hurricane, an explosion, etc.). In these embodiments, the 3D model generation module 135 derives a post-event 3D model for the building site 160.

Figure 3:
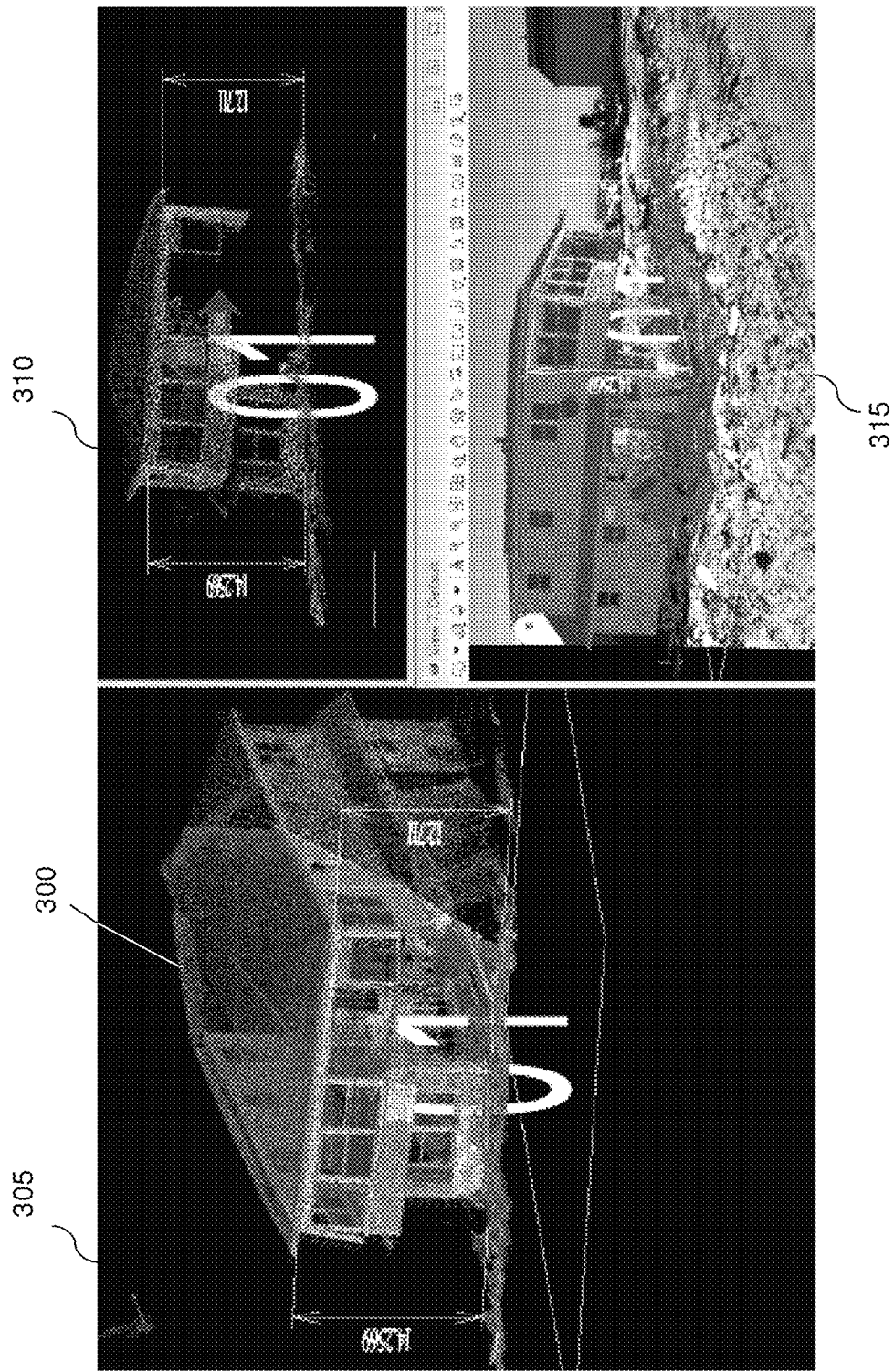
FIG. 3 illustrates several screen shots of a 3D model of a building site generated by the impact assessment system.

FIG. 3 illustrates example screen shots 305, 310, and 315 of a post-event 3D model derived from sensor data of a building site 300. The screen shots 305, 310, and 315 show the building 300 from three different perspectives. Preferably, the 3D model can be rendered to show the building 300 from other perspectives as well. Even more preferably, the 3D model can be rendered to show the building 300 from sufficient number of perspectives to cover the entire building along at least one axis (e.g., the axis that is parallel to the ground). Even more preferably, the 3D model can be rendered to show the building 300 from sufficient number of perspectives to cover the entire building along at least two axes (e.g., the axis that is parallel to the ground and the axis that is perpendicular to the ground).

As shown, the post-event 3D model demonstrates the locations, sizes, shapes, orientations of the different structural elements of the building site 300. Additionally, the post-event 3D model includes information such as the elevation of different parts (e.g., the roof, the front porch, etc.) of the building 300 such that the impact assessment engine 105 can determine if the building 300 is tilted in one direction or not.

In some embodiments, the impact assessment manager 130 can analyze and evaluate damages sustained by the building based on the information presented by the post-event 3D model. For example, the impact assessment manager 130 can determine that the building structure on one side has collapsed based on elevation data indicating that one side of the building is higher than the other side. The impact assessment manager 130 can also look at the different sizes and shapes of the structural elements of the building 300 to determine whether they conform with the normal sizes and shapes of these elements. For example, if a wood beam is detected to be bent compare to other wood beams in the building, the impact assessment manager 130 can determine that the wood beam has sustained structural damages.

In other embodiments, the impact assessment manager 130 analyzes and evaluates damages sustained by the building based on a comparison between the post-event 3D model and a pre-event 3D model. The pre-event 3D model can be derived by the 3D model generation module 135 using sensor data collected by the sensor platform 120 before the disaster. In these embodiments, the impact assessment engine 105 identifies building sites of interest and instructs the sensor platform 120 to obtain sensor data related to the identified building sites prior to the disaster. The 3D model generation module 135 then uses the pre-event sensor data to derive a pre-event 3D model for the building site. In some of these embodiments, the impact assessment engine 105 stores these pre-event 3D models in the pre-disaster database 110 via the database interface 155.

When an event (e.g., a disaster) occurs to a building site (such as building 300), the impact assessment engine 105 instructs the sensor platform to obtain new set of sensor data related to the building 300. The 3D model generation module 135 then derives a new post-event 3D model for the building 300. When the post-event 3D model is derived, the impact assessment manager 130 retrieves the pre-event 3D model of the building 300 from the pre-disaster database 110 and evaluates the damages to the building 300 by comparing the pre-event 3D model and the post-event 3D model. The differences between the pre-event 3D model and the post-event 3D model will be used to assess the damages to the building.

For example, the impact assessment manager 130 can compare the absolute locations of the building 300 or any structural elements (e.g., front door, building frame, roof, etc.) of the building 300 to determine whether there is a shift of foundation based on the absolute locations of the building within the two models. The impact assessment manager 130 can also compare the relative locations of any structural elements of the building 300 to determine if there is a shift of a portion of the foundation based on any difference between the relative locations of any structural elements of the building 300 of the two models. In addition, the impact assessment manager 130 can compare the size, shape, and orientation of each structural element of the building 300 to determine if any of the elements is damaged based on a difference in size, shape and/or orientation between the structural elements from the two models.

Figure 4:
FIG. 4 illustrates several screen shots of another 3D model of a building site generated by the impact assessment system.

FIG. 4 illustrates example screen shots 405 and 410 of a post-event 3D model derived from sensor data of another building site 400. The screen shots 405 and 410 illustrate a post-event 3D model that includes thermal data obtained from the thermal sensors of the sensor platform 120. As shown, the image assessment engine 105 renders the 3D model by using different grey tones to indicate different temperatures within a range of temperature. In this example, low temperature is represented by a darker grey tone in the rendered image and high temperature is represented by a lighter grey tone in the rendered image. As such, the darker portion of the building is indicated as hotter and the lighter portion of the building is indicated as cooler. The impact assessment engine 105 can use this thermal information to determine different types of damages in the building structure. For example, an uneven heat distribution of a portion of a building might indicate an existence of flood damages.

In screen shot 410, it is shown that a portion 415 of the carpet is cooler (having a darker grey tone) than other portions of the carpet. The impact assessment engine 105 can conclude that the portion 415 of the carpet has suffered from flood damages. The thermal information can also be used to determine if there is any surviving body within a collapsed structure by detecting areas within the building site having a heat signature that matches a human body. For more accurate determination, the impact assessment engine would compare the heat distribution between the pre-event 3D model and the post-event 3D model to identify areas of interest. For example, when a portion of the carpet is indicated to have similar thermal signature as other portions of the carpet before the event from the pre-event 3D model and the same portion of the carpet is indicated to be substantially cooler than the other portions of the carpet in the post-event 3D model, the impact assessment engine 105 can assess that there is flood damage in that portion of the carpet.

Figure 5:
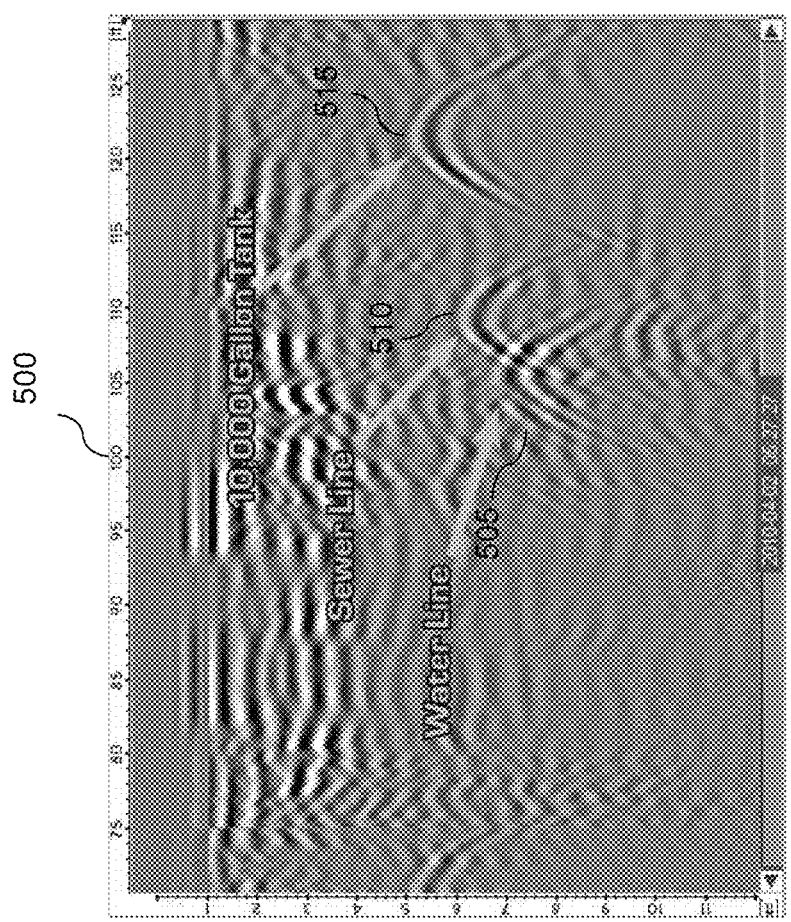
FIG. 5 illustrates a representation of ground-penetrating data obtained by a ground-penetrating radar on underground activities.

FIG. 5 illustrates a representation 500 of sensor data obtained by a ground/wall-penetrating radar for building site 160. The different waves (waves 505, 510, and 515) shown on the representation 500 represent different underground structural elements. In this example, wave 505 represent the underground water line of the building site 160, wave 510 represent the underground sewage line of the building site 160, and wave 515 represent the underground tank of the building site 160. By comparing the representation 500 derived by sensor data captured before the disaster and the representation 500 derived by sensor data captured after the disaster, the impact assessment engine 105 can determine what, if any, kind of damages have been sustained by these underground elements. The ground/wall-penetrating sensor data can be collected in the same manner for within the building structure or other elements not readily visible by human eyes (e.g., being obstructed by a wall, etc.). In some embodiments, the ground/wall-penetrating data can be included in deriving the 3D model for the building site 160.

Referring back to FIG. 1, the impact assessment manager 130 can generate an impact profile based on one or more differences between the pre-event 3D model and the post-event 3D model generated by the 3D module generation module 135. The impact profile can include a list of damages to different elements (e.g., structural damages, below-surface damages, above-surface damages, surface damages, etc.) of the building site 160 that have been determined by the impact assessment manager 130 based on the differences between the two 3D models.

In addition, the impact assessment manager 130 can also retrieve historical cost data for different types of damages from the historic disaster database and estimates a cost for all the damages sustained by the building site 160. In some embodiments, the historic disaster database stores information about damages sustained by building sites in the past and the cost to repair such damages. The impact assessment manager 130 can filter the damage and cost information by damage type, damage element, and geographical area. By analyzing cost data for damages that are similar to the damages sustained by building site 160 according to the differences between the pre-event 3D model and the post-event 3D model, the impact assessment manager 130 can estimate a cost for repairing the damages sustained by the building site 160. In some of these embodiments, the impact assessment manager 130 also includes the cost estimates as part of the impact profile.

Furthermore, the impact assessment manager 130 can identify areas of the building site 160 that are at risk of further damages based on a comparison between the pre-event 3D model and the post-event 3D model. The impact assessment manager 130 can also identify constrained logistical routes to and from the building site 160, communication outage information due to damages sustained by the building site 160 based on the comparison between the pre-event 3D model and the post-event 3D model. Similarly, the risk data, constrained logistical routes data, and communication outage data can also be included as part of the impact profile. The impact assessment manager 130 then configures an output device 125 (e.g., a display device) to present the impact profile.

After generating the impact profiles for the building site 160, the impact assessment manager 130 can store the impact profiles in the historic disaster database as part of historic data for future use.

Instead of generating an impact profile for the building site 160 after a disaster has occurred, the impact assessment engine 105 can also produce a risk profile for the building site 160 based on a simulated disaster. In some embodiments, the impact assessment engine 105 uses the simulation module 150 to simulate a hypothetical disaster (e.g., a typical 100-year flood, a 7.0 earthquake, etc.) on the pre-event 3D model. In some of these embodiments, the simulation module 150 simulates a hypothetical disaster on the pre-event 3D model to generate a simulated post-event 3D model of the building site 160. The impact assessment engine 105 can then generate a risk profile based on differences between the pre-event 3D model and the simulated post-event 3D model using the method described above.

In addition, the impact assessment engine 105 can run multiple simulations that simulate different types of disasters (e.g., different levels of earthquake, flood, explosion, etc.) on the pre-event 3D model of the building site 160. The impact assessment engine 105 can then generate the risk profile for the building site 160 based on the different simulation results. The risk profile can indicate areas within the building site 160 that are most susceptible to damages from one or more types of disasters. Based on the weak areas and the types of damages they are most susceptible to, the impact assessment engine 105 can generate recommendations to improve on the building site 160 to make it more resilient to different types of disasters, and include the recommendations in the risk profile. Similarly, the impact assessment engine 105 can configure an output device 125 to present the risk profile to a user.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A disaster assessment system for a building site comprising:
   a sensor platform configured to acquire sensor data of the building site;
   a pre-disaster database storing pre-event assessment data of the building site based on sensor data acquired by the sensor platform before an event; and
   an impact assessment engine coupled with the pre-disaster and post-disaster databases, and programmed to:
      derive a pre-event three-dimensional (3D) model of the building site based on the pre-event assessment data;
      obtain post-event assessment data of the building site representing information of the building site after multiple simulated disaster, wherein the post-event assessment data is based on damages caused by the multiple simulated disasters on the pre-event three-dimensional (3D) model of the building site;
      derive simulated post-event 3D models of the building site based on the post-event assessment data;
      generate a damage profile representing the damages to the building site caused by the multiple simulated disasters as a function of a difference between the pre-event 3D model and the simulated post-event 3D models across a plurality of dimensions;
      identify weak points of the building site that are vulnerable to substantial damages based on the damage profile; and
      configure an output device to present an impact report based on the damage profile, wherein the impact report includes recommendation to improve the weak points of the building site.

2. The disaster assessment system of claim 1, wherein the post-event assessment data comprises at least location data, floor elevation data, roof elevation data, thermal data, image data, ground penetrating radar data, audio data, laser imaging data, and LIDAR data associated with the building site.

3. The disaster assessment system of claim 1, wherein the image data comprises multiple images captured from ground level.

4. The disaster assessment system of claim 1, further comprising a historic disaster database storing historic disaster data of other building sites, wherein the impact assessment engine is further programmed to:
   calculate a monetary cost related to damages sustained by the building site in the multiple simulated disasters by analyzing the damage profile in view of the historic disaster data of other building sites; and
   configure the output device to present the monetary cost related to the damages sustained by the building site.

5. The disaster assessment system of claim 1, wherein the impact assessment engine is further programmed to identify areas of water damage within the building site based on the post-event 3D model.

6. The disaster assessment system of claim 1, wherein the impact assessment engine is programmed to obtain the post-event assessment data from the sensor platform.

7. The disaster assessment system of claim 1, wherein the difference between the pre-event 3D model and the post-event 3D model comprises a difference in heat distribution across different areas within the building site.

8. The disaster assessment system of claim 1, wherein the weak points of the building site are improved based on the recommendation.

9. The disaster assessment system of claim 1, wherein the sensor platform comprises a plurality of mobile sensor devices.

10. The disaster assessment of claim 9, wherein the mobile sensor devices include a robotic device.

11. The disaster assessment system of claim 9, wherein the mobile sensor devices include an unmanned vehicle.

12. The disaster assessment system of claim 11, wherein the unmanned vehicle comprises an unmanned aerial vehicle.

13. The disaster assessment system of claim 11, wherein the unmanned vehicle comprises an unmanned ground vehicle.

14. The disaster assessment system of claim 1, wherein the sensor platform comprises at least one of the following sensors: a location sensor, a ground penetrating radar sensor, a thermal sensor, an image sensor, an audio sensor, a laser imaging sensor, a seismic sensor, LIDAR, and a wireless sensor.

15. The disaster assessment system of claim 1, wherein the impact assessment engine is further programmed to obtain the post-event assessment data as sensor data from the sensor platform substantially in real-time post event.

16. The disaster assessment system of claim 15, wherein the impact assessment engine is further programmed to instruct the sensor platform to acquire the sensor data at the building site.

17. The disaster assessment system of claim 1, wherein the damage profile includes multiple levels comprising at least one of the following: a below-surface profile, a surface profile, an above-surface profile, and a structure profile.

18. The disaster assessment system of claim 1, wherein the impact report comprises indicators of at risk areas within the building site.

19. The disaster assessment system of claim 1, wherein the impact report comprises a damage estimate.

20. The disaster assessment system of claim 1, wherein the impact report comprises a constrained logistical route.

21. The disaster assessment system of claim 1, wherein the impact report comprises a communication outage.

22. The disaster assessment system of claim 1, wherein the impact report comprises a flooding estimate.

23. The disaster assessment system of claim 1, wherein the impact report comprises a temporary housing requirement.

24. The disaster assessment system of claim 1, wherein the impact report comprises an insurance claim estimate.

25. The disaster assessment system of claim 1, wherein the difference between the pre-event 3D model and the post-event 3D model further comprises a difference in size, shape, or orientation of at least one element within the building site.

26. The disaster assessment system of claim 1, wherein the difference between the pre-event 3D model and the post-event 3D model further comprises a difference in wall-penetrating data.

27. The disaster assessment system of claim 1, wherein the difference between the pre-event 3D model and the post-event 3D model further comprises a difference in locations of at least one element within the building site.

* * * * *

UNITED STATES PATENT AND TRADEMARK OFFICE
CERTIFICATE OF CORRECTION

PATENT NO. : 10,002,339 B2
APPLICATION NO. : 14/329575
DATED : June 19, 2018
INVENTOR(S) : Marnie Ball et al.

It is certified that error appears in the above-identified patent and that said Letters Patent is hereby corrected as shown below:

In the Claims

Column 11, Line 20, please replace "disaster" with ---disasters---

Signed and Sealed this
Eleventh Day of September, 2018

Andrei Iancu
*Director of the United States Patent and Trademark Office*